United States Patent
Gluskoter et al.

[11] Patent Number: 5,818,688
[45] Date of Patent: Oct. 6, 1998

[54] TILTABLE NEGATIVE SLOPE PORTABLE COMPUTER HAVING SLOTTED SUPPORT MEMBERS

[75] Inventors: Steve D. Gluskoter; Bryan F. Howell, both of Austin, Tex.

[73] Assignee: Dell U.S.A. L.P., Round Rock, Tex.

[21] Appl. No.: 785,583

[22] Filed: Jan. 21, 1997

[51] Int. Cl.$^6$ .............................. G06F 1/16; B43L 15/00
[52] U.S. Cl. ...................... 361/680; 400/715; 248/118.1
[58] Field of Search ................................. 400/681, 715; 364/708.1; 248/118, 118.1, 118.3, 118.5, 688, 918; 361/680; 341/22

[56] References Cited

U.S. PATENT DOCUMENTS 5,102,084   4/1992   Park .
5,251,102   10/1993  Kimble .
5,539,615   7/1996   Sellers .

*Primary Examiner*—Michael W. Phillips
*Attorney, Agent, or Firm*—Haynes and Boone, L.L.P.

[57] ABSTRACT

A portable computer having a keyboard and one or more support members that are pivotable from a retracted position to an extended position to raise the front end of the computer. In the extended position, the support member raises the front end of the housing, and therefore tilts the keyboard an amount sufficient to reduce wrist extension from a neutral position when the keyboard is in use.

15 Claims, 3 Drawing Sheets

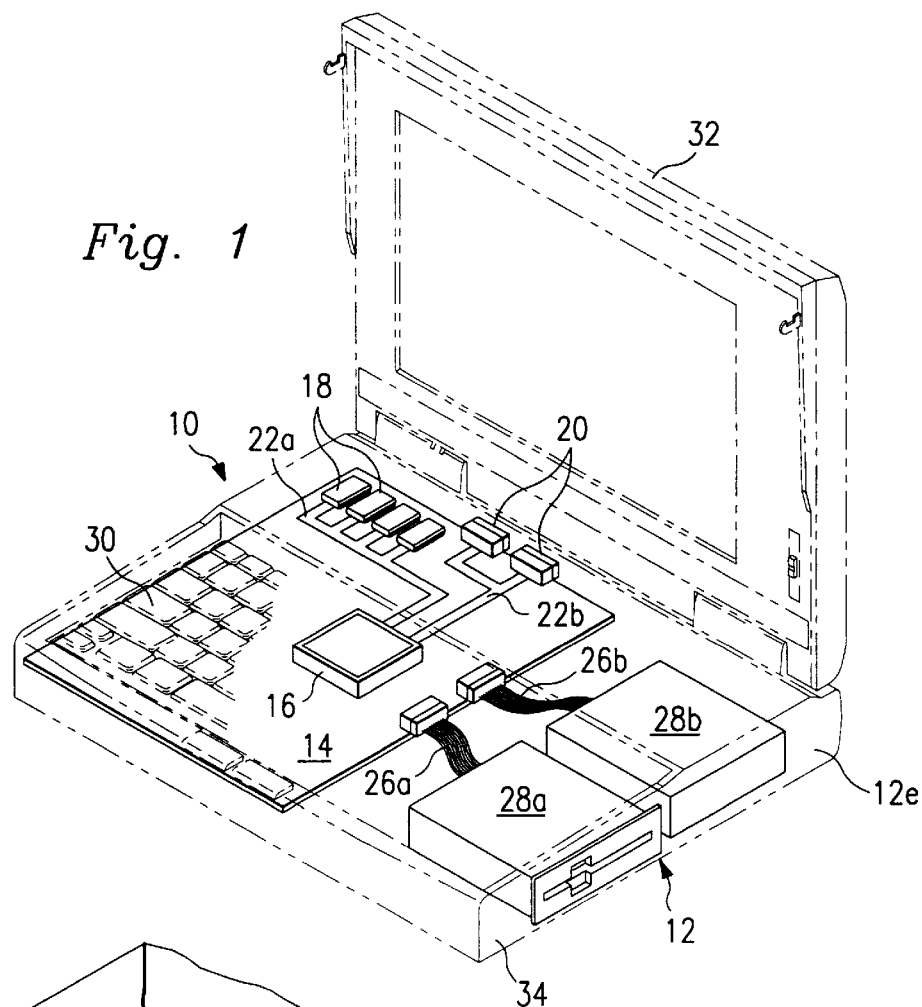
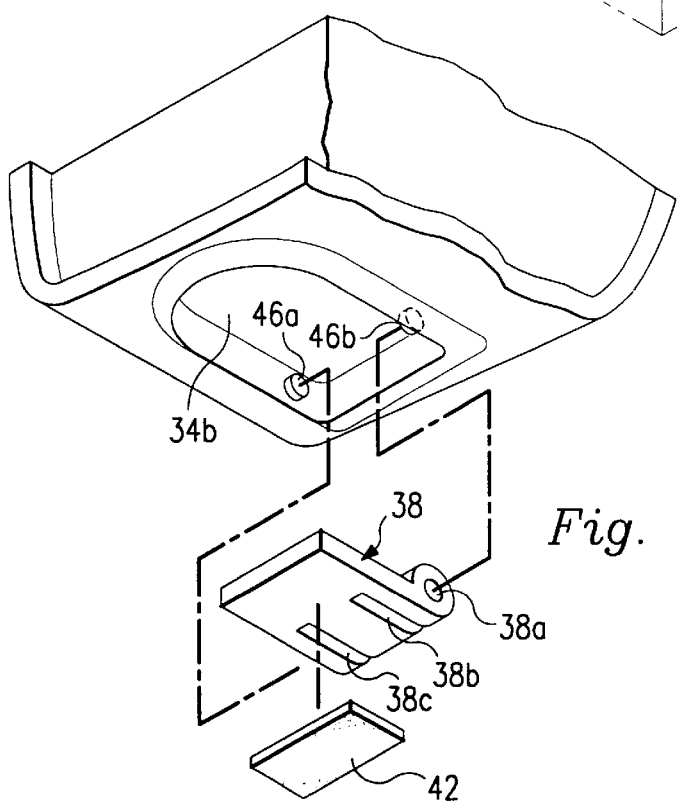

TILTABLE NEGATIVE SLOPE PORTABLE COMPUTER HAVING SLOTTED SUPPORT MEMBERS

TECHNICAL FIELD

The invention relates generally to the field of portable computers, and more particularly to portable computers, including laptops, notebooks, and the like, in which a keyboard and the computer components (processor, memory, etc.) are provided in one housing.

BACKGROUND

Most portable computers include a keyboard which is mounted in, and forms the upper surface of, a housing. When used on a support surface, such as a desk top, the housing either sits flat on the support surface or includes "tilt feet" located at the rear of the computer housing to elevate the rear end of the housing to angle the keyboard toward the user. Many users feel that use of a portable computer in this latter, "positive slope," position is more comfortable.

Therefore what is need is a portable computer that can be tilted to place the user's wrists in a more neutral and comfortable position.

SUMMARY

Accordingly, an embodiment of the present invention is directed to a portable computer that offers a user the option of tilting the computer housing to create a "negative slope," that is, with the keyboard angled away from the user. To this end, at least one support member is provided on the front end of the housing that can be retracted in the housing during nonuse and can be pivoted to an extended, operative position. In the extended position, the support member raises the front end of the housing, and therefore tilts the keyboard an amount sufficient to reduce wrist extension from a neutral position when the keyboard is in use.

Advantages are thus achieved since the keyboard of the computer, when tilted in the manner described above, is more comfortable to use and places the user's wrists is a more neutral position.

BRIEF DESCRIPTION OF THE DRAWINGS

FIG. 1 is an isometric view of the portable computer according to an embodiment of the present invention.

FIG. 4 is an exploded isometric view of a portion of the component of FIG. 3.

DETAILED DESCRIPTION OF THE PREFERRED EMBODIMENT

Figure 2:
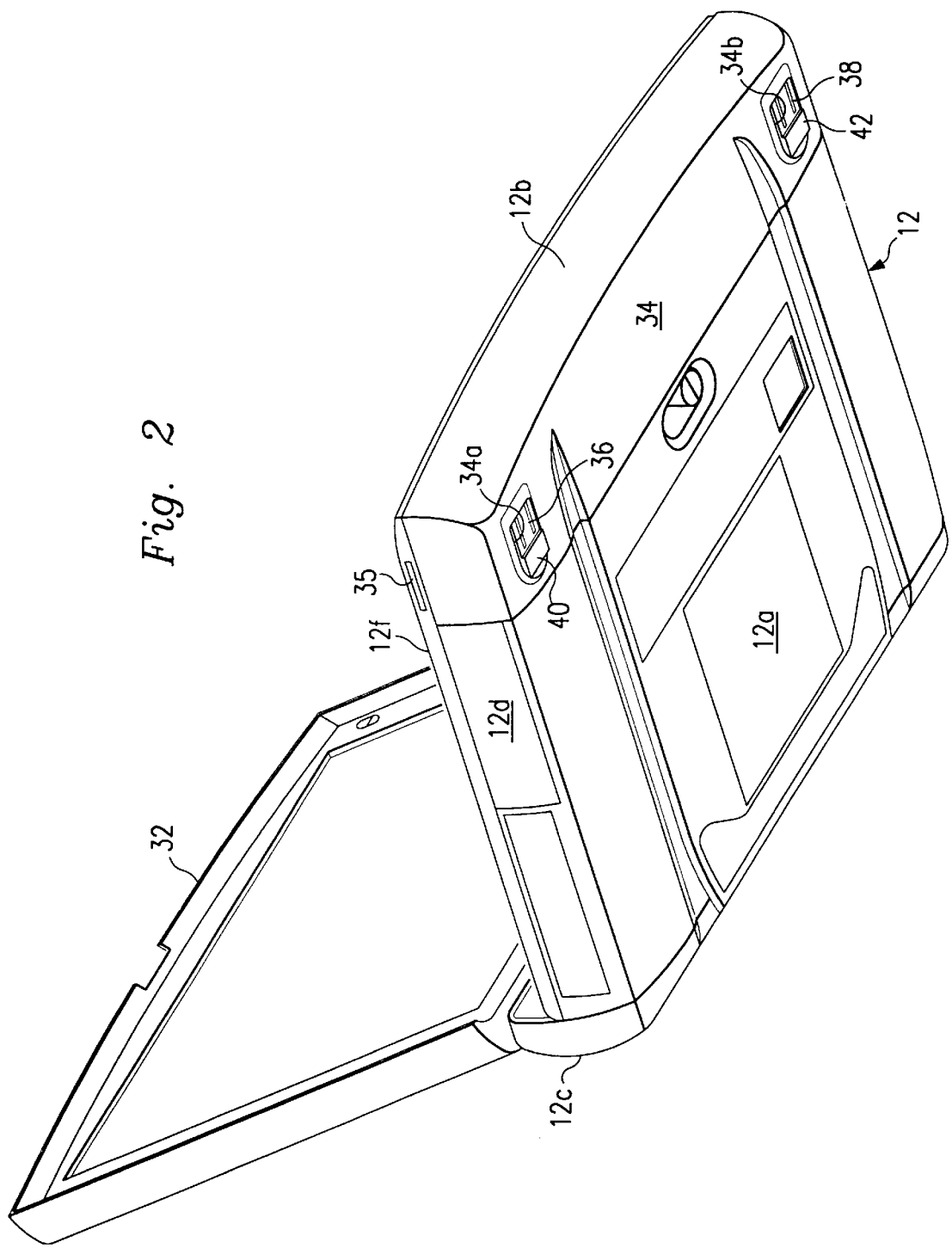
FIG. 2 is an enlarged isometric view of the portable computer of FIG. 1, viewed from below the computer.

Referring to FIG. 1 of the drawings, the reference numeral 10 refers, in general, to a portable computer according to an embodiment of the present invention, which can be a laptop computer, a notebook computer, or the like. The computer 10 includes a housing 12 (shown in phantom lines) in which a motherboard 14 is mounted. A processor 16, memory modules 18, and input/output (I/O) devices 20 are mounted on the motherboard 14. Buses 22a and 22b are also provided on the motherboard 14 that connect the processor 16 to the memory modules 18 and to the input/output devices 20, respectively. A pair of cable assemblies 26a and 26b connect the motherboard 14 to a disk drive unit 28a and to a hard drive unit 28b, respectively. It is understood that a battery and other components, electrical traces, electrical circuits and related devices (not shown) are provided in the housing 12. Since all of the above is conventional, it will not be described in any further detail.

A keyboard 30 (shown partially in FIG. 1) encloses the above components and forms a portion of the upper surface of the housing 12. A cover 32 is hinged to the rear end portion of the housing 12 in any known manner and can be moved between the open position shown and a closed position in which it covers the upper surface of the housing 12, including the keyboard 30.

FIG. 2 depicts the housing 12 in greater detail. More particularly, the housing 12 has a bottom plate 12a, a front end 12b, a rear end 12c, and two sides 12d and 12e (FIG. 1). The reference numeral 12f refers to the upper surface of the housing 12, a great majority of which is formed by the keyboard 30 (FIG. 1).

A battery pack 34 extends underneath the upper surface 12f of the housing 12 for the full width of the housing, and forms a portion of the front end 12b of the housing and an extension of the bottom plate 12a of the housing. The battery pack 34 is attached to and released from the remainder of the housing 12 by a catch mechanism 35 formed on the side wall 12d of the housing 12. Since the battery pack 34 and the catch mechanism 35 per se, do not form any part of the present invention they will not be described in detail.

According to a feature of an embodiment of the invention, two support members, in the form of hinges 36 and 38, are mounted in two indentations 34a and 34b, respectively, formed in the lower surface of the battery pack 34. The hinges 36 and 38 are movable between a retracted position shown in FIG. 2 and an extended position shown in FIG. 3.

Figure 3:
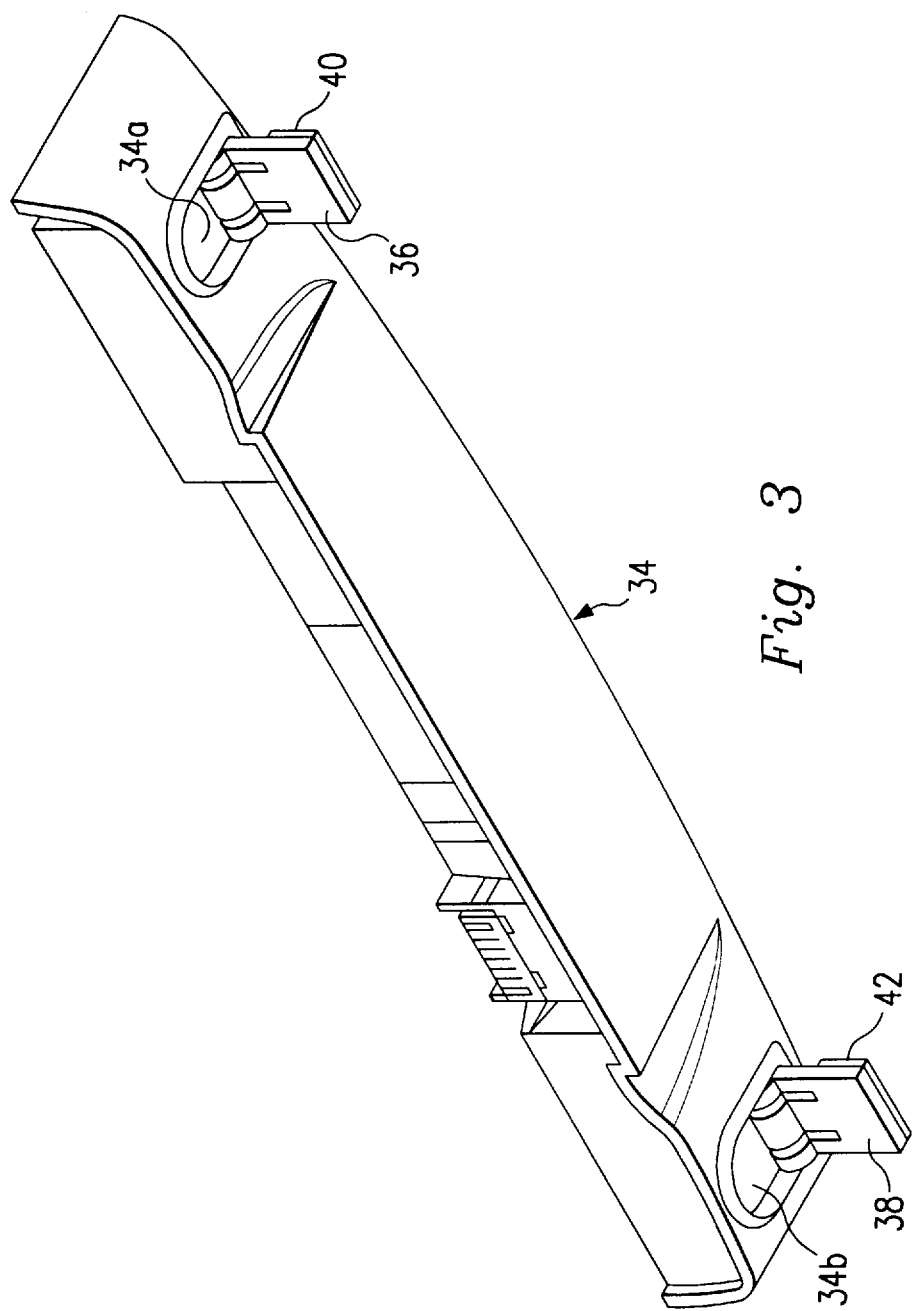
FIG. 3 is an isometric rear view of a component of the computer of FIGS. 1 and 2.

As also shown in FIGS. 2 and 3, a pair of rubber feet 40 and 42 are attached to the bottom surface of the hinges 36 and 38, respectively, in any known manner, such as by adhesive. When the hinges 36 and 38 are in their retracted position in the indentations 34a and 34b, respectively, as shown in FIG. 2, the feet 40 and 42 project very slightly outwardly from the bottom plate 12a of the housing 12 and thus engage the work surface on which the computer 10 is placed. In this context, it is understood that two feet (not shown) can be provided on the bottom plate 12a of the housing 12 near the rear thereof which project the same distance from the latter surface as the feet 40 and 42 when the hinges 36 and 38 are in their retracted positions. Thus, in the retracted positions of the hinges 36 and 38, the housing 12 would be level when supported on a work surface.

FIG. 4 depicts the manner in which the hinges 36 and 38 are attached to the battery pack 34. More particularly, and referring specifically to the hinge 38 and the indentation 34b as an example, a pair of small shafts, 46a and 46b, project inwardly from the inner side walls defining the indentation 34a. A pair of corresponding openings, one of which is shown by the reference numeral 38a, are formed on the respective sides of the hinge 38, and a pair of slots 38b and 38c are formed through the hinge 38 and extend parallel to the sides of the hinge. In this context, the hinge 38 can be molded of plastic with the above openings, including the opening 38a, as well as the slots 38b and 38c, being formed during the molding process.

The hinge 38 is inserted into the indentation 34b by squeezing the respective side edges of the hinge together and inserting the hinge into the indentation. In this squeezed position the above-mentioned openings, including the opening 38a, clear the shafts 46a and 46b, and, upon release of the side edges, the openings will move slightly outwardly due to the spring tension caused by the slots 38b and 38c, and snap into a position in which they extend over the shafts. The hinge 38 can thus be pivoted about an axis extending through the openings, including the opening 38a, between the retracted position shown in FIG. 2 and the extended position shown in FIG. 3. The dimensions of the hinge 38 are such that it is maintained in each position due to a fairly tight frictional fit between its side edges and the corresponding inner walls defining the indentation 34a. It is understood that the hinge 36 is constructed and arranged identically to the hinge 38 and is mounted in the indentation 34a in the same manner.

The hinges 36 and 38 can be placed in their retracted position in the indentations 34a and 34b, respectively, as shown in FIG. 2, during periods of nonuse or when no significant elevation of the keyboard from the work surface is desired. Assuming that it is desired to tilt the housing 12, and, more particularly, elevate the front end 12b of the housing 12, the hinges 36 and 38 are grasped and pivoted to their extended positions shown in FIG. 3. In this position, the hinges 36 and 38 extend substantially perpendicular to the bottom plate 12a of the housing 12 with the upper portions of the front surfaces of the hinges 36 and 38 engaging the front walls forming the indentations 34a and 34b, respectively.

When the computer 10 is placed on a flat work surface (not shown) with the hinges 36 and 38 in their extended positions, the front end 12b of the housing 12 is raised above the rear end a distance corresponding to the approximate distance the hinges 36 and 38 project from the bottom plate 12a of the housing 12. According to a non-limiting, but preferred embodiment, the length of the projecting portion of each hinge 36 and 38 is such that the front end 12b of the housing 12 is raised, and therefore the keyboard 30 is tilted, approximately 2.5 degrees from the horizontal to create a negative slope discussed above, that is, with the keyboard 30 angled away from the user.

It is understood that variations may be made in the foregoing without departing from the scope of the invention. For example, the embodiment described above is not limited to use with the particular type of portable computer as described above by means of example, but is equally applicable to any type of self-contained computer or data processing and/or storage device. Also, the present invention is not limited to a computer having a battery pack, and the hinges, or feet, can be placed anywhere on the bottom surface of the computer housing as long the proper elevation of its front end, and therefore the proper tilt, is achieved. Further, although the support members, according to the embodiment described above, are in the form of hinges, it is understood that the specific type of support members, as well as the number used, can be varied within the scope of the present invention. It is also understood that the embodiment of the assembly of the present invention described above is intended to illustrate rather than limit the invention, and that the mounting assembly can take many other forms and embodiments within the scope of the invention.

What is claimed is:

1. A portable computer comprising a housing having an upper surface and a lower surface, a processor and a memory device disposed in the housing, a keyboard forming at least a portion of the upper surface of the housing, a battery pack mounted to the housing and forming a portion of at least one surface of the housing, and at least one support member pivotally mounted to the battery pack and pivotable between a retracted position and an extended position in which it engages a support surface for the housing to raise a front end of the housing, and therefore tilt the keyboard, an amount that reduces wrist extension from a neutral position when the keyboard is in use.

2. The computer of claim 1 wherein the lower surface of the battery pack forms an extension of the lower surface of the housing and an indentation is formed in the lower surface of the battery pack wherein the support member is received in the retracted position.

3. The computer of claim 2 wherein the support member is in the form of a hinge which is pivotally mounted in the indentation and extends within the indentation in its retracted position.

4. The computer of claim 3 wherein the dimensions of the hinge relative to corresponding walls forming the indentation are such that the hinge is maintained in its retracted and extended positions by friction.

5. The computer of claim 1 further comprising a foot of a resilient material mounted on the support member and adapted to engage the support surface when the support member is in its retracted position.

6. The computer of claim 1 wherein there are two support members extending from the bottom of the lower surface of the battery pack, near the front corners thereof.

7. A method of supporting a portable computer having a keyboard, comprising the steps of providing at least one support member on a bottom surface of the computer which is normally in a retracted position wherein the support member is inserted into an indentation formed in the bottom surface, and moving the support member to an extended position to raise a front end of the computer, and therefore tilt the keyboard, an amount sufficient to reduce wrist extension from a neutral position when the keyboard is in use, the support member including slots formed therethrough for permitting the support member to be flexibly squeezed for insertion into the indentation.

8. The method of claim 7 further comprising the step of moving the support member to the retracted position when the computer is not in use, or when no significant tilt of the computer is desired.

9. A portable computer comprising a housing having an upper surface and a lower surface, a keyboard forming at least a portion of the upper surface of the housing, and at least one support member pivotally mounted to the housing and pivotable between a retracted position wherein the support member is inserted into an indentation formed in the lower surface , and an extended position in which it engages a support surface for the housing to raise a front end of the housing, and therefore tilt the keyboard, an amount that reduces wrist extension from a neutral position when the keyboard is in use, the support member including slots formed therethrough for permitting the support member to be flexibly squeezed for insertion into the indentation.

10. The computer of claim 9 wherein the indentation is formed in the lower surface of the housing wherein the support member is received in the retracted position.

11. The computer of claim 10 wherein the support member is in the form of a hinge which is pivotally mounted in the indentation and extends within the indentation in its retracted position.

12. The computer of claim 11 wherein the dimensions of the hinge relative to the corresponding walls forming the indentation are such that the hinge is maintained in its retracted and extended positions by friction.

13. The computer of claim 9 further comprising a foot of a resilient material mounted on the support member and adapted to engage the support surface when the support member is in its retracted position.

14. The computer of claim 9 wherein there are two support members extending from the lower surface of the housing near front corners thereof.

15. The portable computer as defined in claim 9 wherein the support member includes opposed side edges and one of the slots is formed adjacent each side edge so that the side edges are flexible toward each other.

* * * * *